United States Patent
Hagen et al.

(10) Patent No.: US 6,412,277 B2
(45) Date of Patent: Jul. 2, 2002

(54) ARRANGEMENT FOR PRODUCING A VACUUM IN A MOTOR VEHICLE SYSTEM

(75) Inventors: Aurel Hagen; Peter Klein, both of Stuttgart; Lothar Mauz, Esslingen; Arthur Pradt, Herrenberg; Bernhard Schweizer, Eutingen; Klaus Wunderlich, Waiblingen, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/760,207

(22) Filed: Jan. 12, 2001

(30) Foreign Application Priority Data

Jan. 13, 2000 (DE) .......................... 100 01 060

(51) Int. Cl.[7] .......................... F15B 21/04; F02M 33/02
(52) U.S. Cl. .......................... 60/397; 123/520
(58) Field of Search .................. 60/397, 283; 123/518, 123/519, 520, 533, 516

(56) References Cited

U.S. PATENT DOCUMENTS 4,328,669 A * 5/1982 Mort ........................... 60/397
4,783,962 A * 11/1988 Grein ........................... 60/397
5,970,957 A * 10/1999 Fried et al. .................. 123/520

FOREIGN PATENT DOCUMENTS

| DE | 2 347 701 |   | 4/1974 |
| GB | 2299831 A | * | 10/1996 |
| WO | WO 93/11983 |   | 6/1993 |

* cited by examiner

Primary Examiner—Edward K. Look
Assistant Examiner—Thomas E. Lazo
(74) Attorney, Agent, or Firm—Klaus J. Bach

(57) ABSTRACT

In an arrangement for producing a vacuum in a motor vehicle system including an internal combustion engine with an air intake system, a vacuum-operated power brake system for braking the vehicle and a fuel vapor adsorption system for collecting fuel vapors, a vacuum pump is provided which has a suction side in communication selectively with the vacuum operated power brake system and the fuel vapor adsorption system and a discharge side in communication with the air intake system of the internal combustion engine.

15 Claims, 1 Drawing Sheet

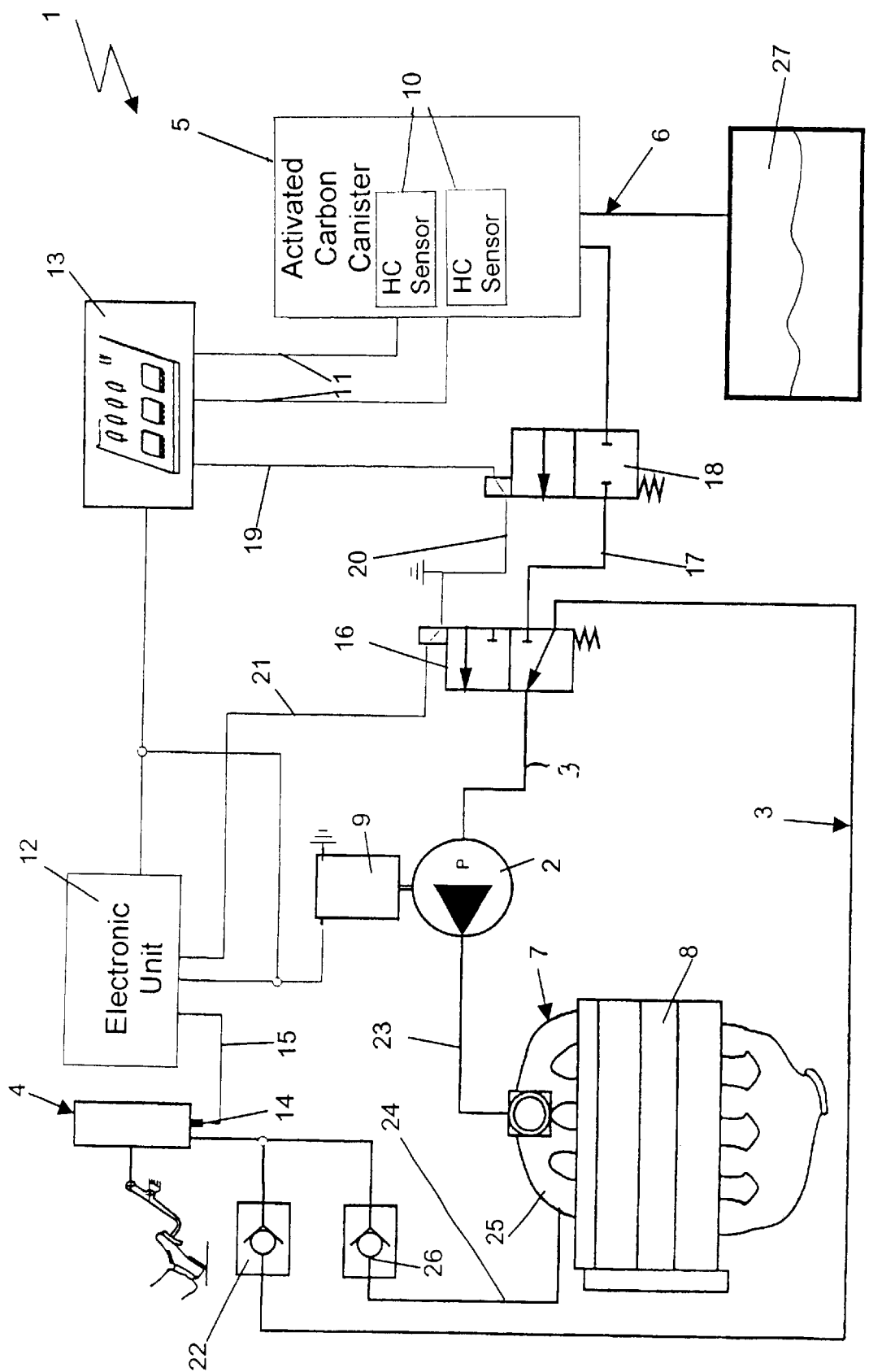

ARRANGEMENT FOR PRODUCING A VACUUM IN A MOTOR VEHICLE SYSTEM

The invention relates to an arrangement for producing a vacuum in a motor vehicle system including a pump, which is connected, with its suction side, to a pneumatic power brake system for generating a vacuum in the power brake system.

It is known in practice that diesel engines are provided with vacuum pumps, which are connected with their suction side to a power brake system in order to produce the vacuum required for its operation. Air taken in from the latter is discharged to the surroundings. Vacuum pumps are needed because diesel engines are operated essentially without the throttle elements, which are provided in the intake ducts of spark-ignition engines. Therefore, in contrast to conventional spark-ignition engines, negative pressure, that is a vacuum, which can be used for operating the power brake systems, is not produced in the intake duct of a diesel engine.

In the case of conventional spark-ignition engines, the airflow to the engine cylinders is restricted in accordance with the amount of fuel injected by a throttle valve arranged in the intake duct. During partial-load operation of the spark-ignition engine, the throttle valve position is controlled to the extent that the cross-section constriction in the intake duct causes the cylinders to have a correspondingly smaller filling. This results in a negative pressure in the suction manifold downstream of the throttle valve. The negative pressure is used in spark-ignition engines for the evacuation of a vacuum reservoir for the power brake system.

Moreover, this vacuum is used in the prior art for the regeneration of a fuel-vapor adsorption system. The vacuum in the intake region is employed to generate a scavenging airflow through the activated-carbon canister.

To meet exhaust-emission regulations, warm-up procedures require that modern engines are driven with retarded ignition and increased idling speed. Also, the power consumed and the friction generated by additional equipment increase the load on the engine. As a result, the throttle valve has to be opened relatively wide during engine warm-up so that the vacuum available during this operating period is very small.

With further efficiency-increasing measures in the spark-ignition engine for a reduction of the consumption, the throttling means may even be fully replaced by controlled direct fuel injection with throttle-free load control and variable inlet valve operation. In these engine concepts, virtually no usable vacuum will be generated in the intake duct, i.e. the intake duct serves exclusively for the supply of air to the cylinders.

This means that, in the new engine concepts, either the throttle valve is omitted or it is largely ineffective for producing a vacuum.

As a result, a vacuum sufficient for operating power brake systems can no longer be generated in the intake duct.

For this reason, even in motor vehicles having spark-ignition engines, the vacuum is produced sometimes by providing a suction pump as it is done in connection with diesel engines, in order to permit operation of the power brake system. Systems of this type are disclosed in DE-A 2 347 701 and WO 93/11983.

However, it has so far not been possible in any of the above-described systems to satisfactorily use the pump in connection with the fuel-vapor-retaining systems arranged in motor vehicles.

The object of the present invention is to provide an arrangement with which a power brake system and a fuel-retaining (fuel vapor adsorption) system can be operated by a vacuum generated by a pump wherein, at the same time, the fuel consumption is reduced and the amount of pollutants emitted are minimized.

SUMMARY OF THE INVENTION

In an arrangement for producing a vacuum in a motor vehicle system including an internal combustion engine with an air intake system, a vacuum-operated power brake system for braking the vehicle and a fuel vapor adsorption system for collecting fuel vapors, a vacuum pump is provided which has a suction side in communication selectively with the vacuum operated power brake system and the fuel vapor adsorption system and a discharge side in communication with the air intake system of the internal combustion engine.

With the arrangement according to the invention, a vacuum can be produced which is sufficient and always available for the operation of a power brake system and which is available over the entire operating range of an internal combustion engine. Moreover, efficient regeneration of a fuel-vapor-retaining system is made possible.

Such a fuel-vapor-adsorption system can also be operated in the high load range or in the full load range of the engine. During high load operation, a high air mass flow is supplied to the engine so that a very efficient regeneration is possible. At the same time, the conversion of the fuel vapors in the engine is particularly effective because of better engine charge conditions. Also, with conventional throttle-controlled engines an insufficient vacuum is generated during high load engine operation for proper braking operation or for a proper regeneration of the fuel vapor adsorber.

The activation of the power-brake system and the regeneration of the fuel vapor adsorber system can be achieved with a single pump. The air flow or air/fuel-vapor flow generated by the pump is introduced into the intake system of the internal combustion engine.

Further advantages and embodiments of the invention will become apparent from the following description of the invention based on the accompanying drawing.

BRIEF DESCRIPTION OF THE DRAWING

The single FIGURE shows a circuit diagram of an arrangement for producing a vacuum in a motor vehicle in accordance with the invention.

DESCRIPTION OF PREFERRED EMBODIMENTS

An arrangement 1 for producing a vacuum in a motor-vehicle system comprises a pump 2, which is connected at its suction side, via a line arrangement 3, to a pneumatic power brake system 4. In addition, an activated-carbon canister 5 of a fuel-vapor-adsorbing system 6, which is known per se and is in communication with a fuel tank 27, is connected to the line arrangement 3 at the suction side of the pump 2. The pump 2 is connected at its delivery side to an air-intake system 7 of an internal combustion engine 8.

The pump 2 is a suction pump driven preferably by an electric motor 9. An encapsulated explosion-protected diaphragm pump 2 has been found to be particularly advantageous, since a diaphragm pump has no leakages and, at a high vacuum without gas flow, consumes only a small amount of power because the gas in the pump chamber acts as a pneumatic spring.

In another embodiment, the pump may be driven by the internal combustion engine via an electromagnetic clutch.

During operation of the arrangement 1, an explosive fuel/air mixture is pumped by the diaphragm pump 2 from the activated-carbon canister 5 to the engine intake duct 7. The diaphragm pump 2 functions in a similar manner as a rubber-bellow system. It is not subject to leakage. No fuel/air mixture flowing from the activated-carbon canister 5 can escape into the surroundings on the suction side of the diaphragm pump 2. The same is true for the delivery side, since the fuel/air mixture conducted on this side of the diaphragm pump 2 is conveyed through the leak-proof line 23 to the intake system 7 and passes from there directly into the internal combustion engine 8, where it is combusted. The engine shown here is a spark-ignition engine.

In contrast to other pumps, the diaphragm pump 2 does not have a shaft extending through a housing wall so that no medium can escape. Such a pump has therefore exceptional explosion-proof properties.

The activated-carbon canister 5 is provided with HC sensors 10, which are connected to an electronic control unit 13 via signal lines 11. The HC-sensors 10 are provided for determining the charge of the activated carbon canister 5. The values determined are transmitted continuously to an electronic motor-control unit 13, which can be a conventional engine-control unit.

The power brake system 4 is provided with a pressure sensor 14, which is connected to the electronic control unit 12 via a signal line 15 and which determines the pressure present in the power brake system 4. This value is transmitted to the control unit 12 via the signal line 15.

In the present exemplary embodiment, the electronic control unit 12 is designed as a separate component of the device 1. However, it is of course within an expert's discretion to integrate the electronic control unit 12 in a control unit, which is already present in the motor vehicle. This may be for example the electronic engine-control unit 13 of the internal combustion engine 8.

A change-over valve designed as a spring-resetting 3/2-port directional control valve 16 is arranged between the diaphragm pump 2, the activated-carbon canister 5 and the power brake system 4. Depending on its switching position, communication is established, via the line system 3, between the diaphragm pump 2 and the power brake system 4 or, by way of a line 17, between the pump 2 and the activated-carbon canister 5.

The regenerating line 17 includes a pulsed fuel tank vent valve 18 and extends between the 3/2-port directional control valve 16 and the activated-carbon canister 5. The 3/2-port directional control valve 16 and the fuel-tank vent valve 18 are in communication with the electronic control unit 12 and the electronic engine-control unit 13 via signal lines 19, 20, 21.

In order to ensure reliable operation, a first non-return valve 22 is arranged in the line 3 between the 3/2-port directional control valve 16 and the power brake system 4. If the diaphragm pump 2 breaks down, air is therefore prevented from flowing into the power brake system 4, and a vacuum present in the power brake system 4 can be maintained.

A throttle element (which is not illustrated as it is known per se) for controlling the amount of air supplied to the internal combustion engine 8 is provided in the intake system 7. A line 23 extends from the diaphragm pump 2 to the intake system 7 and is connected thereto upstream of the throttle element, in the direction of intake air flow. This arrangement ensures that the air evacuated from the power brake system 4 and the air/fuel vapor mixture from the activated-carbon canister are introduced into the intake air duct upstream of the throttle element or the throttle valve. In this way, introduction of air and air/fuel mixture into the intake pipe, which may be evacuated downstream of the throttle valve is avoided so that the throttling of the internal combustion engine 8 cannot be circumvented. The outlay for the control arrangement of the engine is therefore not increased.

A further line 24 of the line system 3 is provided between the intake system 7 and the power brake system 4. The further line 24 is connected to the intake manifold 25 of the intake system 7 downstream of the throttle element. The further line 24 permits a vacuum produced by a throttle element in the intake system 7 to be used additionally for the evacuation of the power brake system 4. However, the vacuum is only applied if it is greater than the vacuum, which can be produced by the electric pump motor 9. The pump motor 9 is switched on by the control unit 22 when the vacuum in the power brake system becomes less than a predetermined value sufficient to safely operate the power brakes.

In order to avoid a back-flow of air/fuel mixture from the intake system 7 into the power brake system 4, a second non-return valve 26 is provided in the further line 24.

During operation of the engine, the diaphragm pump 2 is switched on as a function of the charge of the activated carbon canister 5 and/or of the negative pressure (vacuum) state of the power brake system 4. However, in this case the vacuum requirement of the power brake system 4 is the principal parameter for the electronic control unit 12 because of vehicle safety consideration. This means that, when a pressure above a desired negative pressure is present in the power-brake system 4 that is the vacuum is less than the predetermined value, the 3/2-port directional control valve 16 is switched in such a manner that the diaphragm pump 2 and the power brake system 4 are in line connection and the latter is evacuated by the diaphragm pump 2.

The switching of the 3/2-port directional control valve 16 takes place via the electronic control unit 12 at an appropriate signal from the pressure sensor 14. For this action, the 3/2-port directional control valve 16 is de-energized so that, in this rest position of the 3/2-port directional control valve 16, the suction side of the diaphragm pump 2 is connected to the power brake system 4. It is therefore ensured that the valve 16 is spring-biased to a position in which the vacuum for the power brake system 4 is provided when there is an electrical line interruption to the 3/2-port directional control valve 16.

The fuel adsorbing system 6 is regenerated by switching of the 3/2-port directional control valve 16 depending on need. However, the valve 16 can be switched over only when the power brake system 4 has a vacuum supply sufficient for safe operation of the brakes.

The activated carbon canister 5 is regenerated depending on charge sensing means 10 disposed in the activated-carbon canister 5. For this purpose, the diaphragm pump 2 is activated and the 3/2-port directional control valve 16 is energized, whereby the connection between the diaphragm pump 2 and the activated-carbon canister 5 is established. As a result, an additional air/fuel mixture is supplied to the internal combustion engine 8 resulting in a change of the lambda value of the exhaust gas. Based on the lambda value change, the regeneration procedure of the activated-carbon canister 5 is controlled by the control unit 12 and the engine-control unit by a pulsing of the fuel-tank vent valve 18.

To ensure that the pump is switched on as much as possible only when needed particularly in order to keep the power consumption and the wear of the diaphragm pump 2 to a minimum, the charge of the activated carbon canister 5 is evaluated by evaluation electronics of the electronic control unit 12 using the signals from the HC-sensors 10 in the activated-carbon canister 5. Depending on this evaluation, the diaphragm pump 2 is switched on as required in order to regenerate the fuel-adsorbing system 6.

The fuel-tank vent valve 18 is activated by a pulse-width-modulated activating signal of the electronic unit 12, depending on the engine load and engine speed, when there is a sufficiently large vacuum in the regenerating line 17 and the activated-carbon canister 5 has a sufficiently large charge to justify regeneration.

Since with the pump 2 a virtually constant vacuum level is available, there is a precisely determinable characteristic curve available for controlling the flow volume through the fuel-tank vent valve 18 as a function of the activating signal. As a result, the flow control is greatly simplified and the maximum allowable regenerating flow volume can be supplied to the engine so that operation of the pump is generally necessary only for short periods.

The fuel-tank vent valve 18 is a valve, which can merely be opened and closed. Its opening cross-section cannot be varied. In order to control the flow volume from the activated-carbon canister 5 to the internal combustion engine 8, it is necessary to provide a flow cross-section corresponding to the operating state of the internal combustion engine 8 and the state of the adsorbing system 6. Since, however, the fuel-tank vent valve 18 can only be completely opened or closed, the opening and closing of the fuel-tank vent valve 18 is pulsed in order to simulate a variable opening cross-section.

The pulsing of the fuel-tank vent valve 18 takes place via the pulse-width-modulated signal of the control unit 12, which may, for example, be a square-wave signal recurring at a frequency of 10 Hz. The pulse width of the signal determines the energizing duration and therefore also the opening duration of the fuel-tank vent valve 18. Different pulse widths are therefore used to obtain different opening durations simulating a variable cross section of the fuel-tank vent valve 18.

When the activated-carbon canister 5 is fully charged, the fuel-tank vent valve 18 is operated at a very small pulse ratio. When the activated-carbon canister 5 has a small charge, the fuel-tank vent valve 18 is operated at a large pulse ratio. Since a vacuum is constantly provided by the diaphragm pump 2, the pulse ratio depends on the charge of the activated-carbon canister 5 and on the air mass flow through the internal combustion engine 8.

The arrangement for producing a vacuum in a motor vehicle system is particularly suitable for use in connection with spark-ignition engines. However, it may, of course, also be used in diesel engines or other internal combustion engines, specifically whenever a power brake system and a fuel adsorption system are to be supplied with a sufficient operating vacuum.

What is claimed is:

1. An arrangement for producing a vacuum in a motor vehicle system including an internal combustion engine with an air intake system, a vacuum operated power brake system for braking said vehicle, a fuel vapor adsorption system for collecting fuel vapors and a pump having a suction side in communication selectively by a power brake vacuum line with said vacuum-operated power brake system and by a regeneration line with said fuel vapor adsorption system, and a discharge side in communication by a delivery line with the air intake system of said internal combustion engine.

2. An arrangement according to claim 1, wherein said pump is in electric motor driven suction pump.

3. An arrangement according to claim 1, wherein said pump is driven by said internal combustion engine and a separating clutch is provided which can be activated electromagnetically.

4. An arrangement according to claim 1, wherein said pump is an enclosed, explosion-protected diaphragm pump.

5. An arrangement according to claim 1, wherein said fuel vapor adsorption system includes an activated-carbon canister provided with HC-sensors which are connected, by signal lines, to an electronic control unit.

6. An arrangement according to claim 5, wherein said power brake system includes an electronic control unit, and a vacuum pressure sensor is provided in said power brake system and is connected, via a signal line, to said electronic control unit.

7. An arrangement according to claim 6, wherein said electronic control unit is integrated in an electronic engine-control unit of said internal combustion engine.

8. An arrangement according to claim 7, wherein a regenerating line extends between said 3/2-port directional control valve and said fuel adsorption system, said regenerating line including a pulsed fuel-tank vent valve for controlling the regeneration air flow volume to said engine.

9. An arrangement according to claim 8, wherein said 3/2-port directional control valve and said fuel-tank vent valve are connected via signal lines to said electronic control unit and said electronic engine-control unit.

10. An arrangement according to claim 1, wherein a changeover valve is provided between the diaphragm pump section side and the fuel adsorption system and the power brake system for selectively connecting said power brake system and said fuel adsorption system to the pump section side, said changeover valve being a 3/2-port directional control valve, which is spring-biased to a position providing for the connection of said power brake system to said pump suction side.

11. An arrangement according to claim 1, wherein a first non-return valve is arranged in a vacuum line extending between said 3/2-port directional control valve and said power brake system.

12. An arrangement according to claim 1, wherein a throttle element is provided in the intake system for regulating the amount of air supplied to said internal combustion engine and said delivery line between said diaphragm pump and said intake system is connected to said intake system upstream of an intake air throttle element disposed in the engine air intake duct.

13. An arrangement according to claim 12, wherein a further vacuum line extends between the air intake duct downstream of said throttle element and the power brake system and a second non-return valve is provided in said further vacuum line.

14. Method of controlling the arrangement for producing a vacuum according to claim 1, wherein, with a vacuum less than a predetermined value present in the power brake system, the 3/2-port directional control valve is switched in such a manner that the diaphragm pump suction side and the power brake system are in communication and the vacuum pump is operated.

15. A method according to claim 14, wherein the fuel-tank vent valve is activated via a pulse-width-modulated activating signal of the control unit as a function of engine load and a predetermined charge of the fuel vapor adsorption system when a vacuum is present in said regeneration line.

* * * * *